US012706010B2

(12) United States Patent
Jang et al.

(10) Patent No.: US 12,706,010 B2
(45) Date of Patent: Aug. 11, 2026

(54) FOLDABLE DISPLAY DEVICE AND METHOD OF DRIVING THE SAME

(71) Applicant: Samsung Display Co., LTD., Yongin-si (KR)

(72) Inventors: Dae-Gwang Jang, Yongin-si (KR); Kuk-Hwan Ahn, Yongin-si (KR); Seungjae Lee, Yongin-si (KR); Seongheon Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/030,393

(22) Filed: Jan. 17, 2025

(65) Prior Publication Data

US 2025/0342786 A1 Nov. 6, 2025

(30) Foreign Application Priority Data

May 3, 2024 (KR) ........................ 10-2024-0059275

(51) Int. Cl.

*G09G 3/00* (2006.01)
*G09G 3/20* (2006.01)
*G09G 3/32* (2016.01)

(52) U.S. Cl.

CPC ........... *G09G 3/035* (2020.08); *G09G 3/2007* (2013.01); *G09G 3/32* (2013.01); *G09G 2300/0819* (2013.01); *G09G 2300/0842* (2013.01); *G09G 2320/0223* (2013.01); *G09G 2320/0233* (2013.01); *G09G 2320/041* (2013.01)

(58) Field of Classification Search

None

See application file for complete search history.

(56) References Cited

U.S. PATENT DOCUMENTS

| | | | | |
|---|---|---|---|---|
| 10,656,684 | B2 * | 5/2020 | Wood | G05D 23/1917 |
| 10,748,970 | B2 * | 8/2020 | Kim | G01K 13/00 |
| 10,943,541 | B1 * | 3/2021 | Tan | G09G 3/32 |
| 2016/0190216 | A1 * | 6/2016 | Yang | H10K 77/111 257/40 |
| 2017/0060189 | A1 * | 3/2017 | Sohn | G06F 3/017 |
| 2018/0164854 | A1 * | 6/2018 | Wood | G06F 1/1681 |
| 2019/0074332 | A1 * | 3/2019 | Kim | G01K 13/00 |
| 2021/0173444 | A1 * | 6/2021 | Song | G09F 9/301 |
| 2023/0125796 | A1 * | 4/2023 | Baek | G09G 3/2007 345/212 |
| 2023/0297136 | A1 * | 9/2023 | Ryu | G06F 1/1683 361/679.01 |
| 2024/0144877 | A1 | 5/2024 | Jang | |

FOREIGN PATENT DOCUMENTS

| | | | |
|---|---|---|---|
| CN | 117953820 | A | 4/2024 |
| KR | 10-2024-0062171 | A | 5/2024 |

* cited by examiner

*Primary Examiner* — Kenneth Bukowski

(74) *Attorney, Agent, or Firm* — Womble Bond Dickinson (US) LLP

(57) ABSTRACT

A foldable display device includes a display panel including pixels, a folding region that is configured to be folded to form a folding angle based on a folding line, and a non-folding region adjacent the folding region, a data driver configured to provide a data voltage to the display panel, and a driving controller configured to control the data driver, and to calculate a temperature for a position of the display panel based on the folding angle.

20 Claims, 7 Drawing Sheets

FOLDABLE DISPLAY DEVICE AND METHOD OF DRIVING THE SAME

CROSS-REFERENCE TO RELATED APPLICATION

The present application claims priority to, and the benefit of, Korean Patent Application No. 10-2024-0059275, filed on May 3, 2024, in the Korean Intellectual Property Office, the entire disclosure of which is incorporated herein by reference.

BACKGROUND

1. Field

Embodiments of the present disclosure relates to a foldable display device and a method of driving the same, and to a method for calculating temperatures for positions of a display panel.

2. Description of the Related Art

In general, a display device may include a display panel and a display panel driver. The display panel may include gate lines, data lines, and pixels. The display panel driver may include a gate driver for providing a gate signal to the gate lines, a data driver for providing a data voltage to the data lines, and a driving controller for controlling the gate driver and the data driver.

A luminance of each of the pixels may be determined based on an intensity of the driving current of each of the pixels, the intensity of the driving current may be determined based on a level of the data voltage, and the level of the data voltage may be determined based on a grayscale of input image data received by the driving controller.

When the display panel is driven, the display panel may be heated. The intensity of the driving current may vary according to a temperature of the display panel, and the luminance of each of the pixels may vary. To improve a display quality of the display panel and a reliability and a stability of the display device, the driving controller may calculate a temperature of each of positions of the display panel. The driving controller may control the data driver based on the temperature for each of positions of the display panel such that each of the pixels may emit a light with a same luminance at a same grayscale.

SUMMARY

Embodiments of the present disclosure provide a foldable display device for calculating a temperature for each of corresponding positions of a display panel.

Embodiments of the present disclosure provide a method of driving the foldable display device.

In one or more embodiments of a foldable display device according to the present disclosure, the foldable display device includes a display panel including pixels, a folding region that is configured to be folded to form a folding angle based on a folding line, and a non-folding region adjacent the folding region, a data driver configured to provide a data voltage to the display panel, and a driving controller configured to control the data driver, and to calculate a temperature for a position of the display panel based on the folding angle.

The driving controller may be configured to calculate a resistance change for the position of the display panel, apply the resistance change to a resistance for the position of the display panel to calculate a resistance for a compensation position of the display panel, and calculate the temperature for the position of the display panel based on the resistance for the compensation position of the display panel.

The resistance change for the position of the display panel may increase as the folding angle decreases.

The resistance change for the position of the display panel may be based on a distance from the folding line.

The resistance change for the position of the display panel may increase as the distance from the folding line decreases.

The driving controller may be configured to calculate a resistance change for a line position of the display panel corresponding to the folding line based on the folding angle.

The pixels may include a light-emitting element, a driving transistor configured to provide a driving current to the light-emitting element, and a data write transistor configured to provide the data voltage to the driving transistor.

The driving controller may include a grayscale voltage calculator configured to calculate a grayscale voltage based on a grayscale, a grayscale current calculator configured to calculate a grayscale current based on the grayscale voltage, a driving current calculator configured to calculate a driving current based on the grayscale current, a resistance change calculator configured to calculate a resistance change for the position of the display panel based on the folding angle, a voltage drop calculator configured to apply the resistance change for the position of the display panel to a resistance for the position of the display panel to calculate a resistance for a compensation position of the display panel, and calculate a voltage drop for the position of the display panel based on the driving current and the resistance for the compensation position of the display panel, and a temperature calculator configured to calculate the temperature for the position of the display panel based on the driving current and the voltage drop for the position of the display panel.

The driving current calculator may be configured to compensate for a deterioration due to a use of the pixels to calculate the driving current.

The grayscale received by the grayscale voltage calculator may correspond to a deterioration due to a use of the pixels being compensated for.

In one or more embodiments of a method of driving a foldable display device, the method includes calculating a temperature for a position of a display panel based on a folding angle based on a folding line of the display panel generating a data voltage based on input image data and based on the temperature for the position of the display panel, and providing the data voltage to the display panel.

The method may further include calculating a resistance change for the position of the display panel, applying the resistance change for the position of the display panel to a resistance for the position of the display panel to calculate a resistance a compensation position of the display panel, and calculating the temperature for the position of the display panel based on the resistance for the compensation position of the display panel.

The resistance change for the position of the display panel may increase as the folding angle decreases.

The resistance change for the position of the display panel may be based on a distance from the folding line.

The resistance change for the position of the display panel may increase as the distance from the folding line decreases.

The method may further include calculating a resistance change for a line position of the display panel corresponding to the folding line based on the folding angle.

Pixels of the display panel may include a light-emitting element, a driving transistor configured to provide a driving current to the light-emitting element, and a data write transistor configured to provide the data voltage to the driving transistor.

Calculating the temperature for the position of the display panel may include calculating a grayscale voltage based on a grayscale, calculating a grayscale current based on the grayscale voltage, calculating a driving current based on the grayscale current, calculating a resistance change for the position of the display panel based on the folding angle, applying the resistance change for the position of the display panel to a resistance for the position of the display panel to calculate a resistance for a compensation position of the display panel, calculating a voltage drop for the position of the display panel based on the driving current and the resistance for the compensation position of the display panel, and calculating the temperature for the position of the display panel based on the driving current and the voltage drop for the position of the display panel.

The driving current may be calculated by additionally compensating for a deterioration due to a use of pixels of the display panel.

The grayscale received by the grayscale voltage calculator may be based on compensating for a deterioration due to a use of pixels of the display panel.

In one or more embodiments of an electronic device, the electronic device may include a foldable display device including a display panel including pixels, a folding region that is configured to be folded to form a folding angle based on a folding line, and a non-folding region adjacent the folding region, a data driver configured to provide a data voltage to the display panel, and a driving controller configured to control the data driver, and to calculate a temperature for a position of the display panel based on the folding angle.

The electronic device may include a smartphone, a television, a monitor, a tablet, an electric vehicle, a mobile phone, a tablet personal computer (PC), a mobile communication terminal, an electronic notebook, an electronic book, a portable multimedia player (PMP), a navigation device, an ultra-mobile PC (UMPC), a laptop computer, a billboard, an Internet of Things (IoT) device, a smartwatch, a watch phone, or a head-mounted display (HMD).

According to the foldable display device and the method of driving the foldable display device, the temperatures for various positions of the display panel are calculated based on a corresponding folding angle. Accordingly, the temperature for each of corresponding positions of the display panel included in the foldable display device to which a flexible display technology is applied may be accurately calculated.

BRIEF DESCRIPTION OF THE DRAWINGS

The above and other aspects of embodiments of the present disclosure will become more apparent by describing in detailed embodiments thereof with reference to the accompanying drawings, in which.

DETAILED DESCRIPTION

Figure 1:
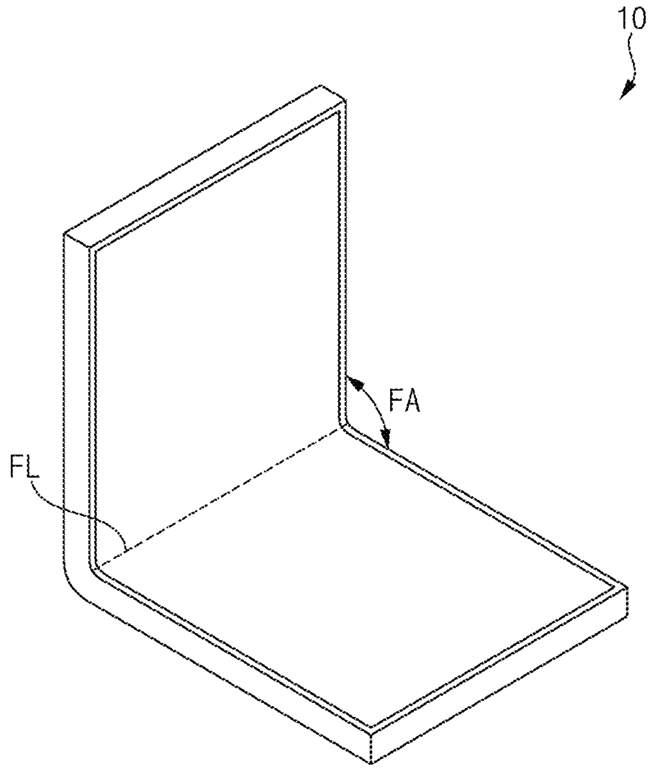
FIG. 1 is a perspective view showing a foldable display device according to embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing one or more embodiments corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

Specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions shown in the drawings, but are to include deviations in shapes that result from, for instance, manufacturing.

Further, the phrase "in a plan view" means when an object portion is viewed from above. It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection.

For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Furthermore, the expression "being the same" may mean "being substantially the same". In other words, the expression "being the same" may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
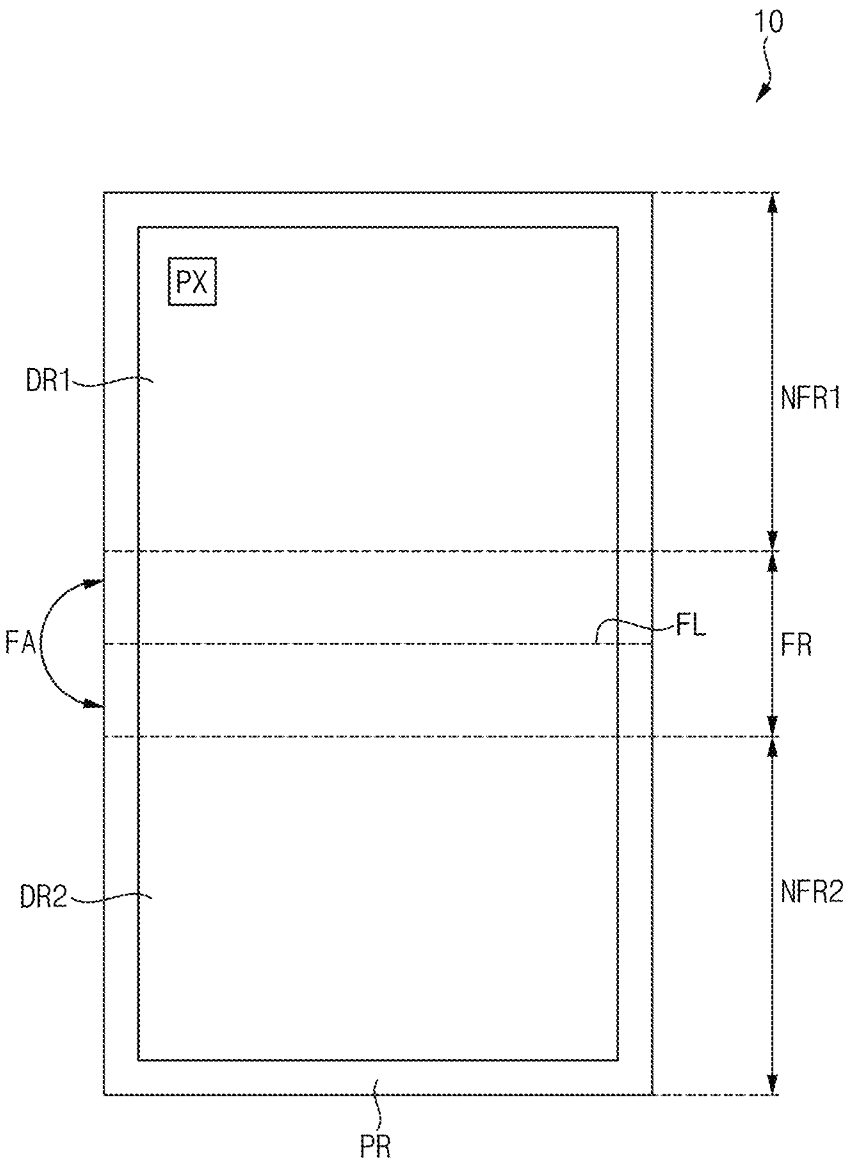
FIG. 2 is a plan view showing a foldable display device of FIG. 1.

FIG. 1 is a perspective view showing a foldable display device 10 according to embodiments of the present disclosure. FIG. 2 is a plan view showing a foldable display device 10 of FIG. 1.

Referring to FIG. 1 and FIG. 2, a foldable display device 10 may be a display device to which a flexible display technology is applied. The flexible display technology may refer to a technology to which a flexible display panel that may be bent without damage is applied. For example, at least a part of the foldable display device 10 may have flexibility and may be folded by an external force based on a folding line PL.

When the foldable display device 10 is folded by the external force, the foldable display device 10 may be folded while forming a folding angle FA based on the folding line PL. In one or more embodiments, the folding angle FA may be about 0 to about 180 degrees. In one or more other embodiments, the folding angle FA may be about 0 to about 360 degrees. However, the flexibility of the folding region FR may vary according to the location, and the degree of folding of the folding region FR may vary according to the location.

The foldable display device 10 may include a folding region FR and a non-folding region NFR1, NFR2 arranged around the folding region FR. The non-folding region NFR1, NFR2 may surround at least a portion of the folding region FR. The folding region FR may have the flexibility, and may be folded by the external force. The non-folding region NFR1, NFR2 may not have the flexibility and may not be folded by the external force. The non-folding region NFR1, NFR2 may include a first non-folding region NFR1 arranged on a first side of the folding line FL, and a second non-folding region NFR2 arranged on a second side of the folding line FL.

The foldable display device 10 may include a display region DR1, DR2, and a peripheral region PR arranged around the display region DR1, DR2 (e.g., in plan view). The peripheral region PR may surround at least a part of the display region DR1, DR2.

A display panel may be arranged in the display region DR1, DR2. The display panel may include pixels PX. A light-emitting element included in each of the pixels PX may emit light. Therefore, the display region DR1, DR2 may display an image. The display region DR1, DR2 may include a first display region DR1 arranged on the first side of the folding line FL, and a second display region DR2 arranged on the second side of the folding line FL.

The foldable display device 10 according to one or more embodiments is a device that displays a moving image and/or a still image. The foldable display device 10 may be applied to portable electronic devices, such as mobile phones, smartphones, tablet personal computers (PCs), mobile communication terminals, electronic notebooks, electronic books, portable multimedia players (PMPs), navigations, and ultra-mobile PCs (UMPCs). For example, the foldable display device 10 may be applied to a display unit of a television, a laptop computer, a monitor, a billboard, or the Internet of Things (IoT). Alternatively, in one or more embodiments, the foldable display device 10 may be applied to a smartwatch, a watch phone, and/or a head-mounted display device (HMD) for implementing virtual reality and/or augmented reality.

A display panel driver for driving the display panel may be arranged in the peripheral region PR. For example, the display panel driver may include a driving controller, a gate driver, a data driver, etc. The peripheral region PR may not display the image.

Figure 3:
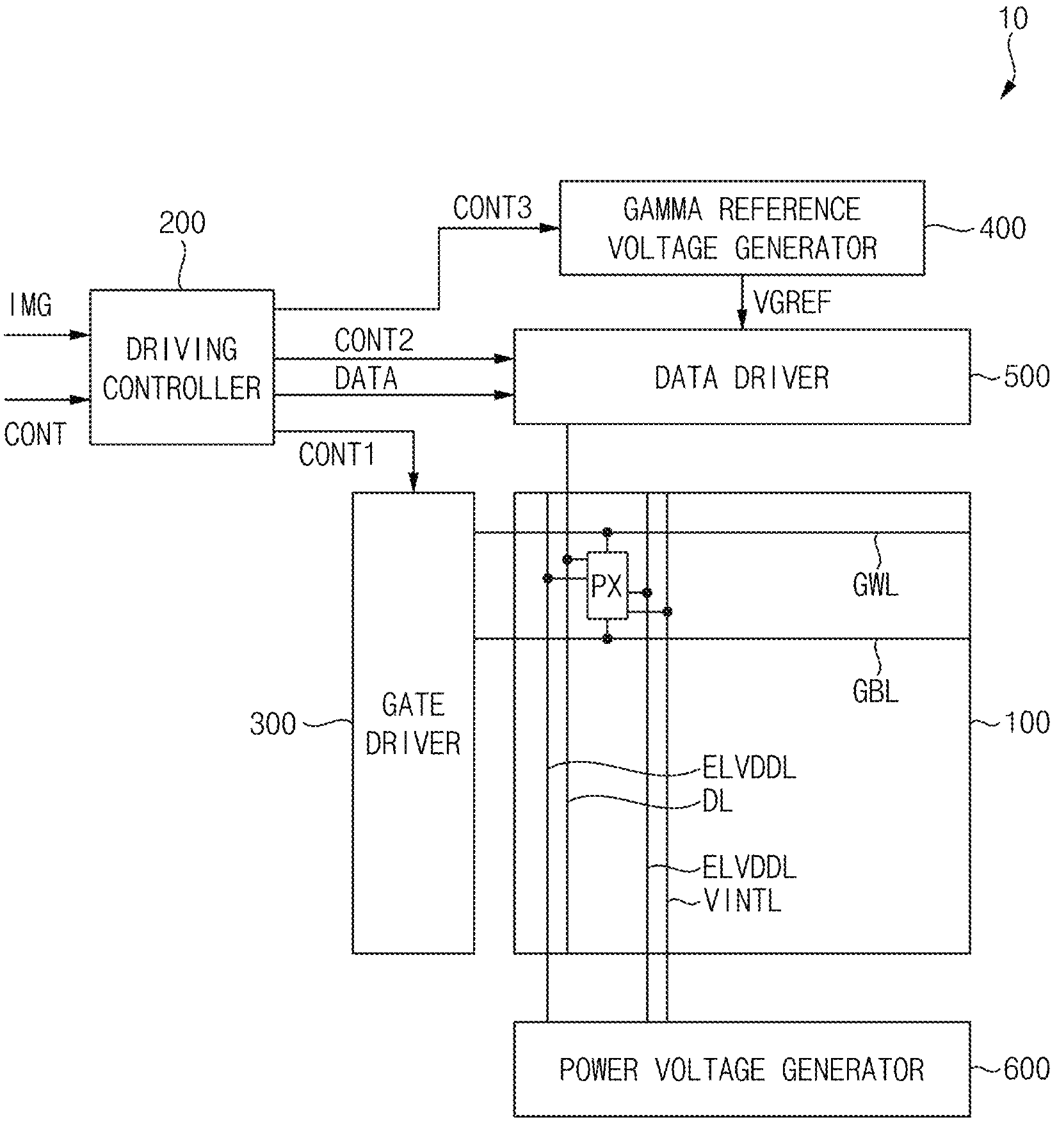
FIG. 3 is a block diagram showing a foldable display device according to embodiments of the present disclosure.

FIG. 3 is a block diagram showing a foldable display device 10 according to embodiments of the present disclosure.

Referring to FIGS. 1 to 3, a foldable display device 10 may include a display panel 100 and a display panel driver. The display panel driver may include a driving controller 200, a gate driver 300, a gamma reference voltage generator 400, and a data driver 500. The display panel driver may further a power voltage generator 600.

The display panel 100 may include gate lines GWL, GBL, data lines DL, power voltage lines ELVDDL, ELVSSL, and initialization voltage lines VINTL, and also may include pixels PX electrically connected to the gate lines GWL, GBL, the data lines DL, the power voltage lines ELVDDL, ELVSSL, and the initialization voltage lines VINTL, respectively.

The driving controller 200 may receive input image data IMG and an input control signal CONT from an external device. For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and may output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and may output the third control signal CONT3 to the gamma reference voltage generator 400.

The gate driver 300 may generate gate signals for driving the gate lines GWL, GBL in response to the first control signal CONT1 received from the driving controller 200. The gate driver 300 may output the gate signals to the gate lines GWL, GBL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

For example, the gamma reference voltage generator 400 may be located in the driving controller 200 or may be located in the data driver 500.

The data driver 500 may receive the second control signal CONT2 and the data signal DATA from the driving controller 200, and may receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

The power voltage generator 600 may generate a power voltage required for driving at least one of the display panel 100, the driving controller 200, the gate driver 300, the gamma reference voltage generator 400, and the data driver 500. For example, the power voltage generator 600 may generate a first power voltage ELVDD, a second power voltage ELVSS, and an initialization voltage VINT. The power voltage generator 600 may provide the first power voltage ELVDD and the second power voltage ELVSS to the power voltage lines ELVDDL, ELVSSL, and may provide the initialization voltage VINT to the initialization voltage lines VINTL.

Figure 4:
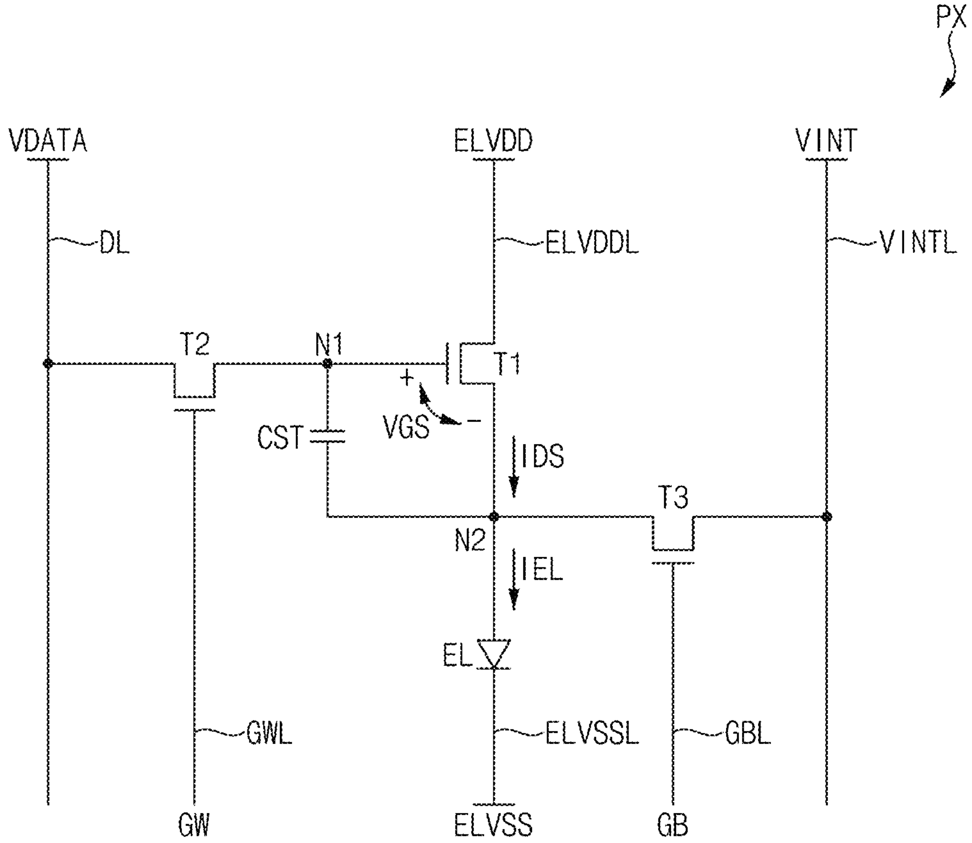
FIG. 4 is a circuit diagram showing an example of a pixel of FIG. 3.
Figure 5:
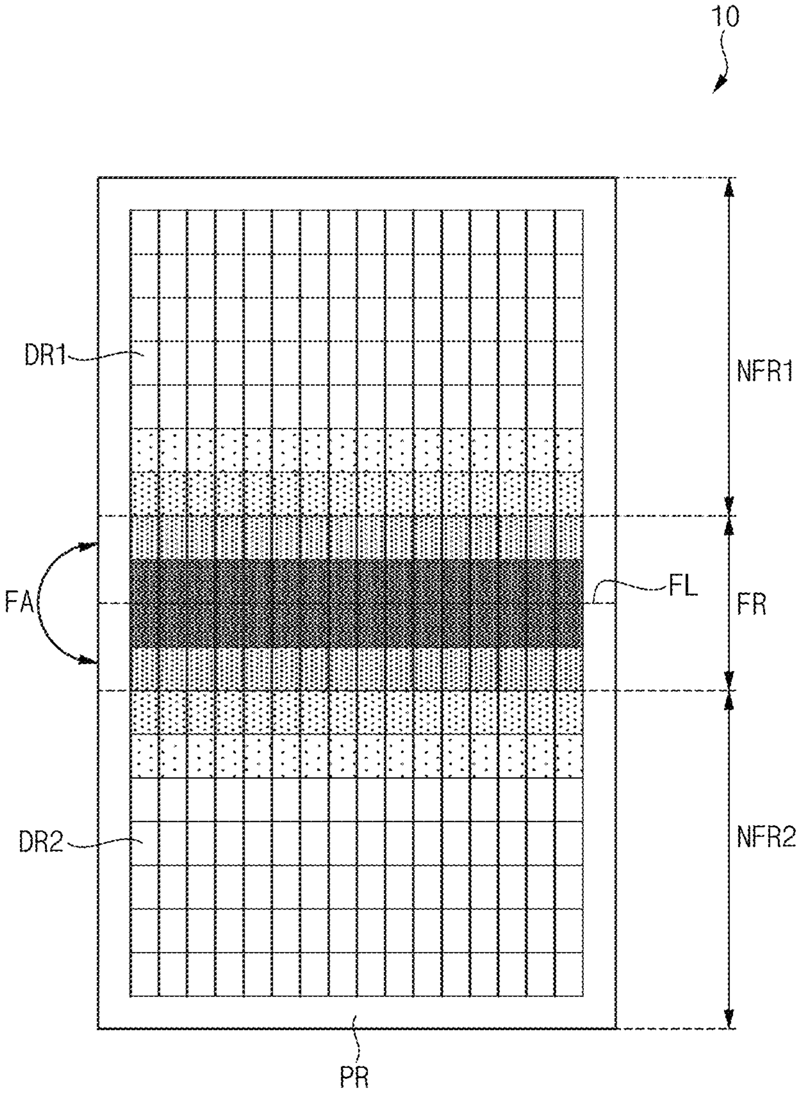
FIG. 5 is a diagram showing a resistance of a display panel according to a position according to a folding angle.

FIG. 4 is a circuit diagram showing an example of a pixel PX of FIG. 3. FIG. 5 is a diagram showing a resistance of a display panel 100 according to a position according to a folding angle FA.

Referring to FIGS. 1 to 5, the pixel PX may include a first transistor T1, a second transistor T2, a third transistor T3, a storage capacitor CST, and a light-emitting element EL.

The first transistor T1 may include a gate electrode connected to a first node N1, a first electrode connected to a first power voltage line ELVDDL that transmits a first power voltage ELVDD, and a second electrode connected to a second node N2. The first transistor T1 may generate a drain current IDS based on a gate-source voltage VGS. The gate-source voltage VGS of the first transistor T1 may be a difference between a voltage of the first node N1 a voltage of the second node N2.

The second transistor T2 may include a gate electrode connected to a data write gate line GWL that transmits a data write gate signal GW, a first electrode connected to a data line DL that transmits a data voltage VDATA, and a second electrode connected to the first node N1. The second transistor T2 may provide the data voltage VDATA to the first node N1 in response to the data write gate signal GW.

The third transistor T3 may include a gate electrode connected to an anode initialization gate line GBL that transmits an anode initialization gate signal GB, a first electrode connected to an initialization voltage line VINTL that transmits an initialization voltage VINT, and a second electrode connected to the second node N2. The third transistor T3 may provide the initialization voltage VINT to the second node N2 in response to the anode initialization gate signal GB.

The storage capacitor CST may include a first electrode connected to the second node N2 and a second electrode connected to the first node N1. The storage capacitor CST may store the data voltage VDATA.

The light-emitting element EL may include an anode connected to the second node N2, and a cathode connected to a second power voltage line ELVSSL that transmits a second power voltage ELVSS. The light-emitting element EL may emit a light based on a driving current IEL. A luminance of the light-emitting element EL may be determined based on an intensity of the driving current IEL.

The driving current IEL may correspond to the drain current IDS. The driving current IEL may be determined based on elements (i.e., transistors, capacitors, lines) included in the pixel PX, as well as the drain current IDS. Therefore, even if the drain current IDS is a same, when the elements included in the pixel PX are different, the driving current IEL may be different.

In one or more embodiments, the first transistor T1, the second transistor T2, and the third transistor T3 may be N-type transistors. For example, the N-type transistor may be an NMOS (N-type Metal Oxide Semiconductor) transistor. However, the present disclosure is not limited thereto. In addition, in FIG. 4, the pixel PX is shown as including three transistors T1, T2, T3 and one capacitor CST, but the present disclosure is not limited thereto.

Meanwhile, the power voltage lines ELVDDL, ELVSSL may include a resistance, and a voltage drop IR DROP may occur due to the resistance of the power voltage lines ELVDDL, ELVSSL, and the display panel 100 may be heated. As described above, the foldable display device 10 may be folded based on the folding line PL. When the foldable display device 10 is folded based on the folding line PL, a resistance for each of corresponding positions of the power voltage lines ELVDDL, ELVSSL may vary according to the folding angle FA. For example, when the folding angle FA decreases, the resistance for each of the corresponding positions of the power voltage lines ELVDDL, ELVSSL may increase overall. However, a resistance change for each of the corresponding positions of the power voltage lines ELVDDL, ELVSSL may vary according to a distance from the folding line FL. For example, as shown in FIG. 5, the closer the distance from the folding line FL, the greater the resistance change for each of the corresponding positions of the power voltage lines ELVDDL, ELVSSL.

When the resistance change for each of the corresponding positions of the power voltage lines ELVDDL, ELVSSL varies, the voltage drop may vary. Therefore, a temperature for each of corresponding positions of the display panel 100 may vary according to the folding angle FA. Accordingly, for the pixel PX to emit a light with a same brightness at a same grayscale, the driving controller 200 is required to additionally calculate the temperature for each of the corresponding positions of the display panel 100 based on the resistance for each of the corresponding positions of the power voltage lines ELVDDL, ELVSSL according to the folding angle FA. Here, the resistance for each of the corresponding positions of the power voltage lines ELVDDL, ELVSSL is an example of a resistance for each of the corresponding positions of the display panel 100. Therefore, the present disclosure will be described later that the resistance for each of the corresponding positions of the display panel 100 varies according to the folding angle FA.

Figure 6:
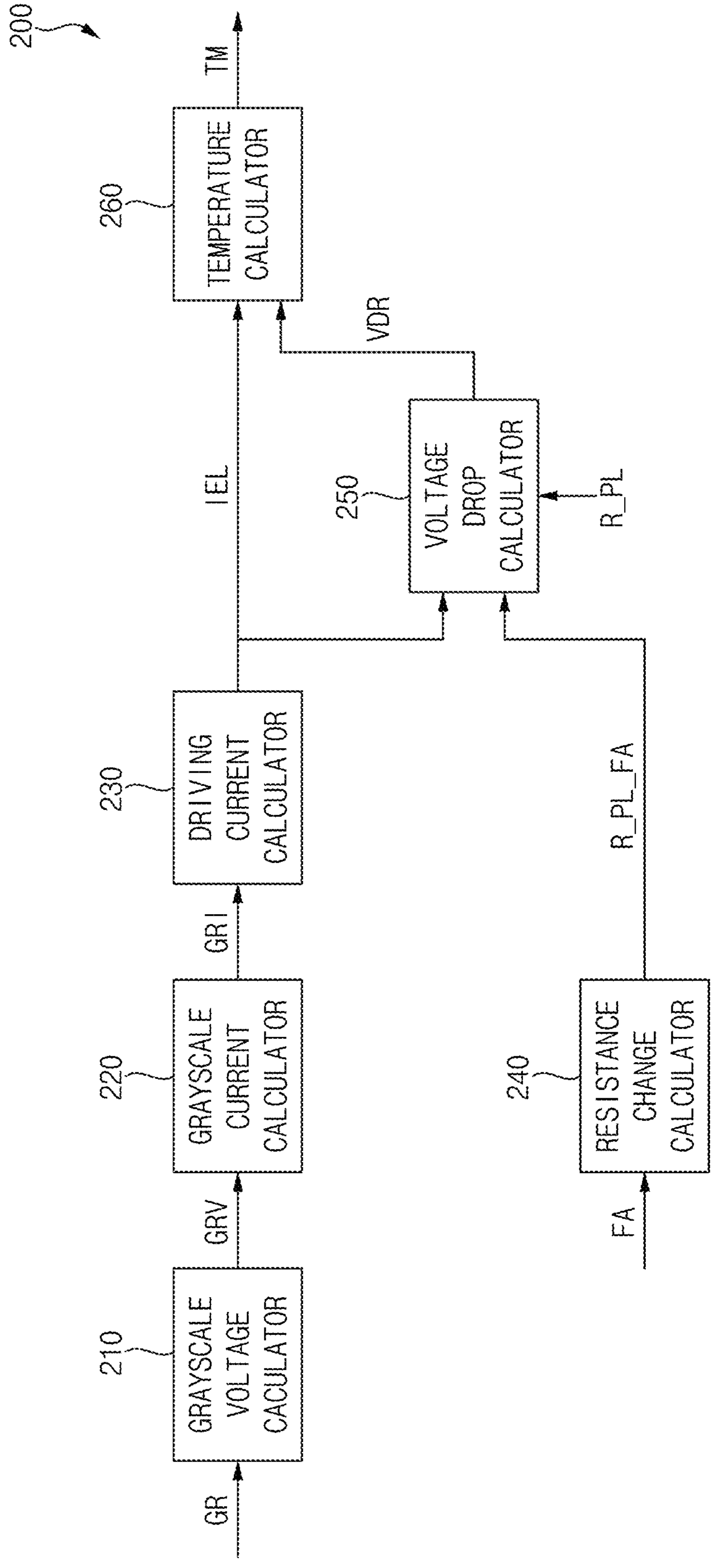
FIG. 6 is a block diagram showing a driving controller of FIG. 3.

FIG. 6 is a block diagram showing the driving controller 200 of FIG. 3.

Referring to FIGS. 1 to 5, the driving controller 200 may include a grayscale voltage calculator 210, a grayscale current calculator 220, a driving current calculator 230, a resistance change calculator 240, a voltage drop calculator 250, and a temperature calculator 260.

The grayscale voltage calculator 210 may receive a grayscale GR of the input image data IMG, and may calculate a grayscale voltage GRV corresponding to the grayscale GR based on the grayscale GR. For example, the grayscale GR may be 0-grayscale to 255-grayscale, and the grayscale voltage calculator 210 may calculate a voltage corresponding to each of the 0-grayscale to 255-grayscale as the grayscale voltage GRV. For example, the grayscale voltage GRV corresponding to the grayscale GR may have one value for each of the pixels PX.

The grayscale current calculator 220 may calculate a grayscale current GRI based on the grayscale voltage GRV. For example, the grayscale current GRI may be the drain current IDS described in FIG. 4. For example, the grayscale current GRI may have a value for each of the pixels PX.

The driving current calculator 230 may calculate the driving current IEL based on the grayscale current GRI. For example, the driving current calculator 230 may calculate the driving current IEL by additionally considering elements (i.e., transistors, capacitors, lines) included in the pixel PX in addition to the grayscale current GRI.

The resistance change calculator 240 may calculate a resistance change R_PL_FA for each of the corresponding positions of the display panel 100 based on the folding angle FA. The resistance change calculator 240 may calculate the resistance change R_PL_FA for each of the corresponding positions of the display panel 100 according to the folding angle FA. For example, the resistance change calculator 240 may calculate the resistance change R_PL_FA for each of the corresponding positions of the display panel 100 to increase as the folding angle FA decreases. The resistance change calculator 240 may calculate the resistance change amount R_PL_FA for each of the corresponding positions of the display panel 100 according to the distance from the folding line FL. For example, the resistance change calculator 240 may calculate the resistance change R_PL_FA for each of the corresponding positions of the display panel 100 to increase as the distance from the folding line FL get closer. In addition, because the resistance change R_PL_FA for each of the corresponding positions of the display panel 100 varies according to the distance from the folding line FL, the resistance change calculator 240 may calculate a resistance change for each line position of the display panel 100 corresponding to the folding line FL based on the folding angle FA. That is, the resistance change calculator 240 may calculate a resistance change for each line position of the display panel 100 for each line parallel to the folding line FL.

The voltage drop calculator 250 may calculate a voltage drop VDR for each of the corresponding positions of the display panel 100 based on the driving current IEL, based on the resistance change amount R_PL_FA for each of the corresponding positions of the display panel 100, and based on a resistance R_PL for each of the corresponding positions of the display panel 100. For example, the voltage drop calculator 250 may apply the resistance change R_PL_FA for each of the corresponding positions of the display panel 100 to the resistance R_PL for each of the corresponding positions of the display panel 100 to calculate a resistance for each compensation position of the display panel 100, and may calculate the voltage drop VDR for each of the corresponding positions of the display panel 100 based on the driving current IEL and the resistance for each compensation position of the display panel 100.

The temperature calculator 260 may calculate the temperature TM for each of the corresponding positions of the display panel 100 based on the driving current IEL and the voltage drop VDR for each of the corresponding positions of the display panel 100. For example, a power consumption for each of the corresponding positions of the display panel 100 may be a product of the driving current IEL and the voltage drop VDR for each of the corresponding positions of the display panel 100. As the power consumption for each of the corresponding positions of the display panel 100 increases, the temperature TM for each of the corresponding positions of the display panel 100 may increase.

As such, the foldable display device 10 may calculate the temperature TM for each of the corresponding positions of the display panel based on the folding angle FA. Accordingly, the temperature TM for each of the corresponding positions of the display panel 100 included in the foldable display device 10 to which a flexible display technology is applied may be accurately calculated.

Meanwhile, the pixels PX may deteriorate according to a use, and the driving controller 200 may additionally compensate for the deterioration of the pixels PX. For example, the driving current calculator 230 may additionally compensate for the deterioration of the pixels PX according to the use to calculate the driving current IEL. For example, the grayscale GR received by the grayscale voltage calculator 210 may be in a state in which the deterioration of the pixels PX according to use has been compensated for.

Figure 7:
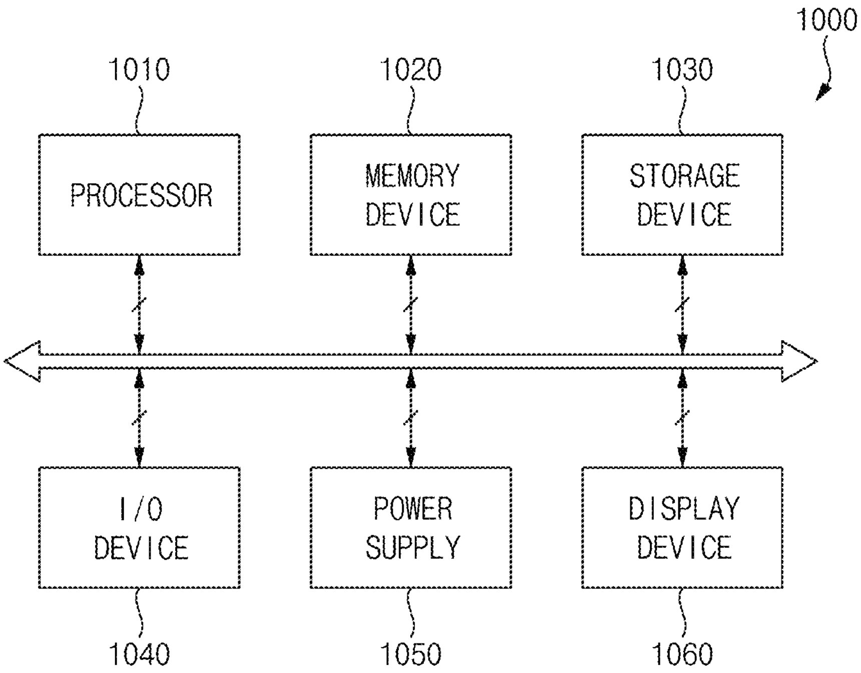
FIG. 7 is a block diagram showing an electronic device.
Figure 8:
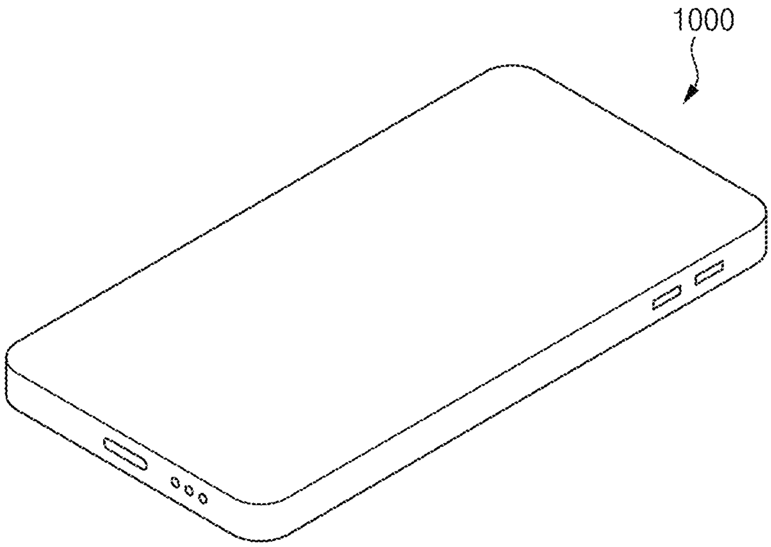
FIG. 8 is a diagram showing one or more embodiments in which an electronic device of FIG. 7 is implemented as a smart phone.

FIG. 7 is a block diagram showing an electronic device 1000. FIG. 8 is a diagram showing one or more embodiments in which an electronic device 1000 of FIG. 7 is implemented as a smart phone.

Referring to FIGS. 7 and 8, the electronic device 1000 may include a processor 1010, a memory device 1020, a storage device 1030, an input/output I/O device 1040, a power supply 1050, and a display device 1060. The display device 1060 may be the foldable display device 10 of FIG. 1. In addition, the electronic device 1000 may further include a plurality of ports for communicating with a video card, a sound card, a memory card, a universal serial bus USB device, other electronic device, and the like.

In one or more embodiments, as illustrated in FIG. 8, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display HMD device, and the like.

The processor 1010 may perform various computing functions. The processor 1010 may be a microprocessor, a central processing unit CPU, an application processor AP, and the like. The processor 1010 may be coupled to other components via an address bus, a control bus, a data bus, and the like. Further, the processor 1010 may be coupled to an extended bus, such as a peripheral component interconnection PCI bus.

The memory device 1020 may store data for operations of the electronic device 1000. For example, the memory device 1020 may include at least one nonvolatile memory device, such as an erasable programmable read-only memory EPROM device, an electrically erasable programmable read-only memory EEPROM device, a flash memory device, a phase change random access memory PRAM device, a resistance random access memory RRAM device, a nano floating gate memory NFGM device, a polymer random access memory PoRAM device, a magnetic random access memory MRAM device, a ferroelectric random access memory FRAM device, and the like and/or at least one volatile memory device, such as a dynamic random access memory DRAM device, a static random access memory SRAM device, a mobile DRAM device, and the like.

The storage device 1030 may include a solid state drive SSD device, a hard disk drive HDD device, a CD-ROM device, and the like.

The I/O device 1040 may include an input device, such as a keyboard, a keypad, a mouse device, a touch-pad, a touch-screen, and the like, and an output device, such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The embodiments of the present disclosure may be applied to any display device and any electronic device including the touch panel. For example, the embodiments of the present disclosure may be applied to a mobile phone, a smart phone, a tablet computer, a digital television TV, a 3D TV, a personal computer PC, a home appliance, a laptop computer, a personal digital assistant PDA, a portable multimedia player PMP, a digital camera, a music player, a portable game console, a navigation device, etc.

The foregoing is illustrative and is not to be construed as limiting thereof. Although a few embodiments have been described, those skilled in the art will readily appreciate that many modifications are possible in the embodiments without materially departing from the novel teachings and aspects of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative, and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A foldable display device comprising:
- a display panel comprising:
  - pixels;
  - a folding region that is configured to be folded to form a folding angle based on a folding line; and
  - a non-folding region adjacent the folding region;
- a data driver configured to provide a data voltage to the display panel; and
- a driving controller configured to control the data driver, and to calculate a temperature for a position of the display panel based on corresponding to the folding angle based on a driving current and a voltage drop for the position of the display panel,
- wherein the driving controller comprises:
  - a grayscale voltage calculator configured to calculate a grayscale voltage based on a grayscale;
  - a grayscale current calculator configured to calculate a grayscale current based on the grayscale voltage;
  - a driving current calculator configured to calculate the driving current based on the grayscale current;
  - a resistance change calculator configured to calculate a resistance change for the position of the display panel based on the folding angle;
  - a voltage drop calculator configured to:
    - apply the resistance change for the position of the display panel to a resistance for the position of the display panel to calculate a resistance for a compensation position of the display panel; and
    - calculate the voltage drop for the position of the display panel based on the driving current and the resistance for the compensation position of the display panel; and
  - a temperature calculator configured to calculate the temperature for the position of the display panel based on the driving current and the voltage drop for the position of the display panel.

2. The foldable display device of claim 1, wherein the driving controller is configured to:
- calculate the resistance change for the position of the display panel;
- apply the resistance change to a resistance for the position of the display panel to calculate the resistance for the compensation position of the display panel; and
- calculate the temperature for the position of the display panel based on the resistance for the compensation position of the display panel.

3. The foldable display device of claim 2, wherein the resistance change for the position of the display panel increases as the folding angle decreases.

4. The foldable display device of claim 2, wherein the resistance change for the position of the display panel is based on a distance from the folding line.

5. The foldable display device of claim 4, wherein the resistance change for the position of the display panel increases as the distance from the folding line decreases.

6. The foldable display device of claim 2, wherein the driving controller is configured to calculate a resistance change for a line position of the display panel corresponding to the folding line based on the folding angle.

7. The foldable display device of claim 1, wherein the pixels comprise:
- a light-emitting element;
- a driving transistor configured to provide the driving current to the light-emitting element; and
- a data write transistor configured to provide the data voltage to the driving transistor.

8. The foldable display device of claim 1, wherein the driving current calculator is configured to compensate for a deterioration due to a use of the pixels to calculate the driving current.

9. The foldable display device of claim 1, wherein the grayscale received by the grayscale voltage calculator corresponds to a deterioration due to a use of the pixels being compensated for.

10. A method of driving a foldable display device comprising:
- calculating a temperature for a position of a display panel based on a folding angle based on a folding line of the display panel, the temperature being based on a driving current and a voltage drop for the position of the display panel;
- generating a data voltage based on input image data and based on the temperature for the position of the display panel; and
- providing the data voltage to the display panel,
- wherein calculating the temperature for the position of the display panel comprises:

calculating a grayscale voltage based on a grayscale;

calculating a grayscale current based on the grayscale voltage;

calculating the driving current based on the grayscale current;

calculating a resistance change for the position of the display panel based on the folding angle;

applying the resistance change for the position of the display panel to a resistance for the position of the display panel to calculate a resistance for a compensation position of the display panel;

calculating the voltage drop for the position of the display panel based on the driving current and the resistance for the compensation position of the display panel; and calculating the temperature for the position of the display panel based on the driving current and the voltage drop for the position of the display panel.

11. The method of claim 10, further comprising:

calculating the resistance change for the position of the display panel;

applying the resistance change for the position of the display panel to a resistance for the position of the display panel to calculate the resistance for the compensation position of the display panel; and calculating the temperature for the position of the display panel based on the resistance for the compensation position of the display panel.

12. The method of claim 11, wherein the resistance change for the position of the display panel increases as the folding angle decreases.

13. The method of claim 11, wherein the resistance change for the position of the display panel is based on a distance from the folding line.

14. The method of claim 13, wherein the resistance change for the position of the display panel increases as the distance from the folding line decreases.

15. The method of claim 11, further comprising calculating a resistance change for a line position of the display panel corresponding to the folding line based on the folding angle.

16. The method of claim 10, wherein pixels of the display panel comprise:

a light-emitting element;

a driving transistor configured to provide the driving current to the light-emitting element; and a data write transistor configured to provide the data voltage to the driving transistor.

17. The method of claim 10, wherein the driving current is calculated by additionally compensating for a deterioration due to a use of pixels of the display panel.

18. The method of claim 10, wherein the grayscale received by the grayscale voltage calculator is based on compensating for a deterioration due to a use of pixels of the display panel.

19. An electronic device comprising a foldable display device comprising:

a display panel comprising:

pixels;

a folding region that is configured to be folded to form a folding angle based on a folding line; and a non-folding region adjacent the folding region;

a data driver configured to provide a data voltage to the display panel; and a driving controller configured to control the data driver, and to calculate a temperature for a position of the display panel based on the folding angle based on a driving current and a voltage drop for the position of the display panel, wherein the driving controller comprises:

a grayscale voltage calculator configured to calculate a grayscale voltage based on a grayscale;

a grayscale current calculator configured to calculate a grayscale current based on the grayscale voltage;

a driving current calculator configured to calculate the driving current based on the grayscale current;

a resistance change calculator configured to calculate a resistance change for the position of the display panel based on the folding angle;

a voltage drop calculator configured to:

apply the resistance change for the position of the display panel to a resistance for the position of the display panel to calculate a resistance for a compensation position of the display panel; and calculate the voltage drop for the position of the display panel based on the driving current and the resistance for the compensation position of the display panel; and a temperature calculator configured to calculate the temperature for the position of the display panel based on the driving current and the voltage drop for the position of the display panel.

20. The electronic device of claim 19, wherein the electronic device comprises a smartphone, a television, a monitor, a tablet, an electric vehicle, a mobile phone, a tablet personal computer (PC), a mobile communication terminal, an electronic notebook, an electronic book, a portable multimedia player (PMP), a navigation device, an ultra-mobile PC (UMPC), a laptop computer, a billboard, an Internet of Things (IoT) device, a smartwatch, a watch phone, or a head-mounted display (HMD).

* * * * *